Oct. 21, 1952   P. G. GATES   2,614,380
LAWN MOWER GRASS CATCHER
Filed Sept. 9, 1950   2 SHEETS—SHEET 1

INVENTOR.
PAUL G. GATES
BY Hazard & Miller
ATTORNEYS

Oct. 21, 1952 P. G. GATES 2,614,380
LAWN MOWER GRASS CATCHER
Filed Sept. 9, 1950 2 SHEETS—SHEET 2
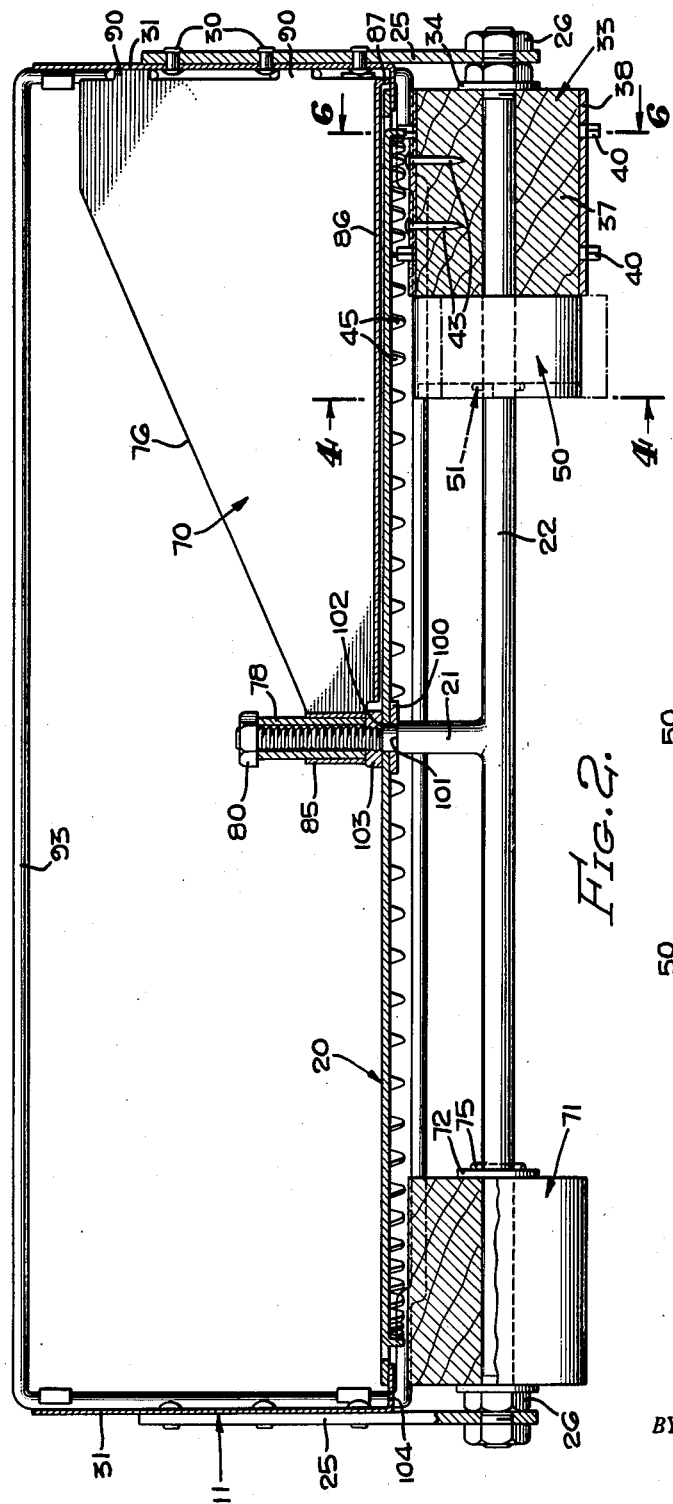
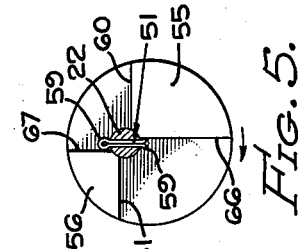
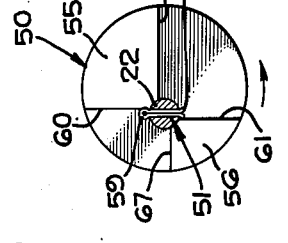
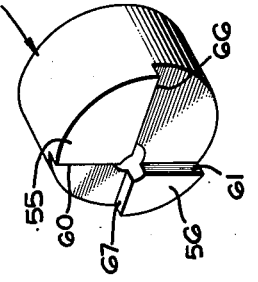
INVENTOR.
PAUL G. GATES
BY
Hazard & Miller
ATTORNEYS Patented Oct. 21, 1952

2,614,380

UNITED STATES PATENT OFFICE 2,614,380

LAWN MOWER GRASS CATCHER

Paul G. Gates, Long Beach, Calif.

Application September 9, 1950, Serial No. 184,043

5 Claims. (Cl. 56—199)

This invention relates to lawn mowers, and in particular to a lawn mower having an improved grass catcher.

In the usual lawn mower having a grass catcher with a stationary floor, the grass cuttings from the helical blades of the mower are deposited on one side of the floor of the grass catcher by virtue of the shape of the blades. This condition makes it necessary for the operator of the mower to move the grass from one side of the grass catcher to the other side or the back of the catcher to fully load the catcher. Furthermore, in many types of mowers the cuttings thrown backwardly by the cutting blades are deposited at the forward margin or portion of the grass catcher and at frequent intervals the user of the mower must move the grass cuttings to the rear of the grass catcher to make room for further cuttings.

A main object of the present invention is to provide an improved grass catcher having a rotary floor which floor is arranged to receive grass cuttings from the cutting mechanism on the lawn mower and to convey the grass to a barrier provided on the grass catcher where the grass is dammed up and collected.

Another object of the present invention is to provide an improved grass catcher as above brought out wherein the barrier is swingably mounted to permit the barrier to be swung to a neutral position when the grass cuttings in the grass catcher are being dumped, the barrier when in its neutral position not impeding the dumping of the grass cuttings from the catcher.

Another object of the present invention is to provide an improved grass catcher which has a ground-engaging mechanism which engages the ground to be driven thereby and which mechanism serves to drive the rotary floor only in the direction intended regardless of backward or forward movements of the grass catcher over the ground.

Another object of the present invention is to provide a grass catcher having a rotary floor and above which is provided a barrier having a grass cuttings carrier associated therewith to receive and support grass cuttings dammed up by the barrier.

With the foregoing and other objects in view, which will be made manifest in the following detailed description and specifically pointed out in the appended claims, reference is had to the accompanying drawings for an illustrative embodiment of the invention, wherein:

Fig. 2 is a cross-sectional view on an enlarged scale in elevation along lines 2—2 of Fig. 1, taken in the direction of the arrows;

Fig. 4 is a cross-sectional view in elevation along lines 4—4 in Fig. 2 in the direction of the arrows showing the lifting device of the driving mechanism in the position it occupies when the grass catcher is being moved forwardly;

Fig. 5 is a view similar to Fig. 4, showing the lifting device of the driving mechanism for the rotary floor in the position which it assumes when the grass catcher is moved rearwardly;

Fig. 6 is a fragmentary sectional view in elevation along lines 6—6 of Fig. 2, taken in the direction of the arrows and showing the driving gear in engagement with the crown gear on the rotary floor; and Fig. 7 is a perspective view of the lifter device of the driving mechanism for the rotary floor.

Figure 1:
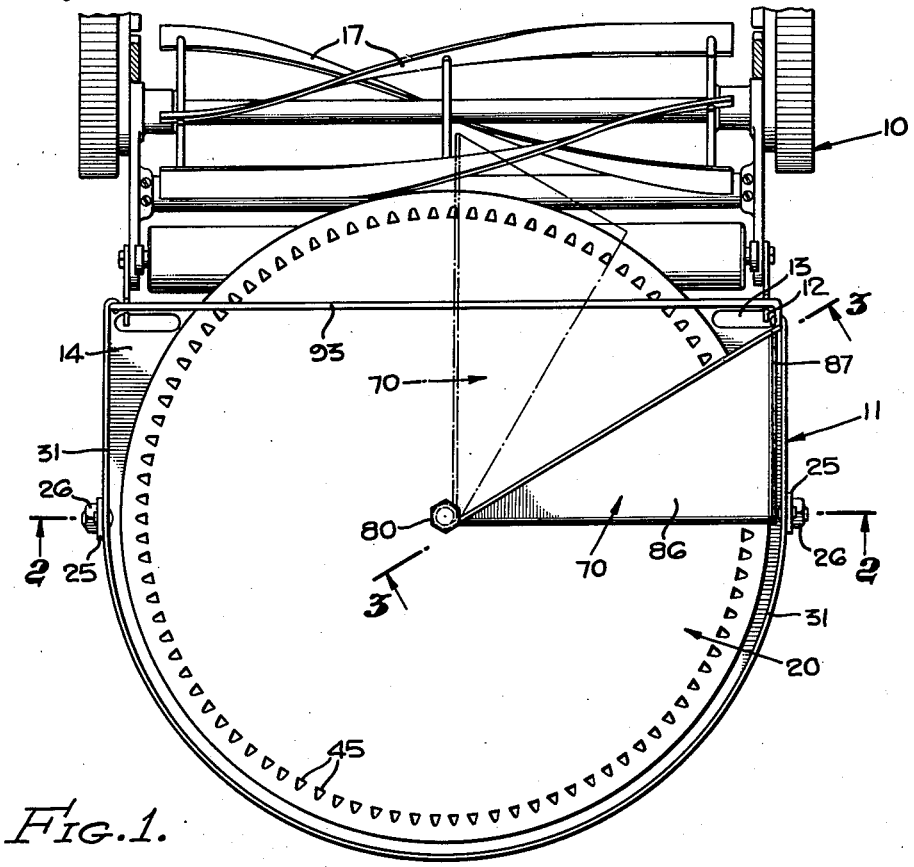
Figure 1 is a plan view of a lawn mower having a grass catcher embodying the present invention detachably connected thereto.

Referring to the accompanying drawings wherein similar reference characters designate similar parts throughout, Fig. 1 shows an apparatus wherein there is a lawn mower proper indicated at 10 and a grass catcher embodying the concepts of the present invention indicated at 11 detachably secured to the lawn mower proper by the usual upstanding lugs 12 and apertures 13, which apertures are located in the bottom 14 of the grass catcher 11.

The lawn mower 10 has the usual helical blades 17 which serve, when the lawn mower is driven in a forward direction, to cut grass and deposit the grass cuttings on the bottom of the grass catcher with a major portion of the cuttings being deposited on the left-hand side of the bottom of the grass catcher as the parts are depicted in Fig. 1. Some lawn mowers of the above type also operate to deposit a major portion of the grass cuttings on the forward portion of the grass catcher. The result is that the grass cutting operation must be interrupted at frequent intervals to move the grass cuttings to the right-hand side of the grass catcher and to the back of the grass catcher to load the grass catcher to capacity. The grass catcher of the present invention overcomes the above disadvantages by being provided with a rotary floor 20 which is rotatably mounted on a central post 21 by means of a washer 100 resting on a shoulder 101 formed on post 21. There is a second shoulder 102 against which a nut 103 is threaded so that the rotary floor is rotatably contained between the nut 103 and washer 100. The outer circumferential margin of floor 20 rests on and slides along the bottom 14 of the grass catcher, as clearly shown.

Post 21 is connected to a transverse axle 22 which axle is secured at its ends in hangers 25 by locknuts 26, said hangers being secured by rivets 30 to the sides 31 of the grass catcher 11. There is a rotary ground engaging driving roller 33 rotatably mounted on axle 22 and separated from the adjacent locknut 26 by a washer 34. There is a ground engaging idler roller 71 rotatably mounted on the opposite end of the axle 22 and idler roller 71 is preferably constructed of wood and prevented from endwise movement by washers 72 and a cotter pine 75.

Driving roller 33 has a wood center 37 and a metallic sheath 38 which is secured to center 37 by nails 43. Sheath 38 has two spaced rows of driving teeth 40 struck out therefrom. The right-hand row of teeth as the parts are depicted in Fig. 2, is arranged to engage depending crown teeth 45 which are struck down from rotary floor 20. Both sets of teeth 40 on driving roller 33 engage the ground and serve to drive the roller, but the left-hand row does not engage the crown teeth. However, when the right-hand row of crown teeth wears considerably, the driving roller 33 can be reversed to allow the left-hand row of teeth 40 to be positioned in right-hand position to engage the crown teeth 45.

The right-hand row of teeth 40 on driving roller 33 is adapted to drive rotary floor 20 when the lawn mower is advanced but it is desired to drive the floor 20 only in one direction regardless of whether the grass catcher is being moved forwardly or backwardly across the ground. To this end a ground engaging lifter roller 50 is rotatably mounted in eccentric fashion on axle 22 and prevented from endwise movement by a cotter pin 51 which passes through axle 22 and which is located on the left-hand side of the lifter roller as the parts are depicted in Fig. 2. The left-hand side of lifter roller 50 is formed to provide quadrant-shaped stop members 55 and 56, members 55 being larger than members 56 due to the eccentricity of lifter roller 50. When the grass catcher is moved forwardly the eccentric lifter roller which engages the ground is moved in a clockwise direction as the parts are depicted in Fig. 4, until the protruding portions 59 of the cotter pin 51 engage faces 60 and 61 of stop members 55 and 56, respectively. In this position, the lower surface of the eccentric roller is caused to assume a position located slightly above the lower surface of driving roller 33, and therefore, the ground engaging teeth 40 engage the ground and drive the rotary floor 20 in a counter-clockwise direction as the parts are viewed in Fig. 1. When the grass catcher is moved in a rearward direction the lifter roller 50 is rotated by its engagement with the ground to the position shown in Fig. 5 where the protruding portions 59 of cotter pin 51 engage the faces 66 and 67 of the stops 55 and 56, respectively. The lifter roller in this position prevents engagement of the teeth 40 with the ground, as clearly shown in dot-dash lines in Fig. 2. When the grass catcher is once again moved forwardly, the lifter roller is rotated by its engagement with the ground to the full-line position shown in Fig. 2, permitting engagement of the teeth 40 with the ground to once again drive the rotary floor 20 in a clockwise direction. Therefore, the rotary floor 20 is intermittently advanced in a counterclockwise direction as the parts are depicted in Fig. 1, and therefore, the grass cuttings on the rotary floor will be conveyed around and be dammed up by a barrier 70.

Barrier 70 is best shown in Figs. 1 and 2 and has a downwardly and inwardly inclined edge 76, the inner margin of the barrier 70 being bent to encircle a spacer collar 78 which encircles post 21. There is a nut 80 threadedly received at the upper end of post 21 to retain the collar 78 thereon. As can be seen from Fig. 2, the spacer collar 78 is considerably longer than the encircling portion 85 of the barrier 70 thereby permitting vertical movement of the encircling portion 85 and the barrier 70 with relation to spacer collar 78 and post 21 for purposes to be described.

There is a grass cuttings carrier 86 associated with barrier 70 and which carrier is provided by bending the lower edge of barrier 70 at right angles to the barrier 70 providing in the particular embodiment of the invention shown a triangularly-shaped carrier 86 although the particular shape of the carrier is not important. The outer edge 87 of carrier 86 is reversely bent to engage the floor 14 of the grass catcher and support the carrier 86, see Fig. 2.

Figure 3:
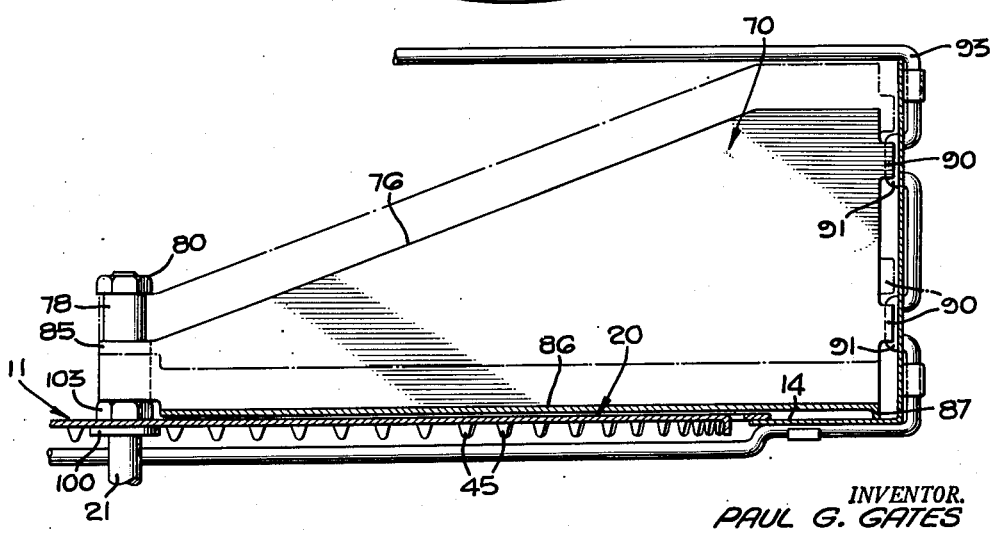
Fig. 3 is a fragmentary sectional view on an enlarged scale in elevation along lines 3—3 of Fig. 1, taken in the direction of the arrows.

The outer margin of the barrier 70 is provided with lugs 90 which are adapted to engage bends 91 provided in a forward frame member 93 formed of wire and which frame member encircles the forward portion of the grass catcher as shown in Fig. 3, and is secured to the sides 31 of the grass catcher by bending margins of the sides 31 and floor 14 around the frame member 93 or in any other suitable manner.

As best shown in Fig. 3, the barrier 70 can be manually moved upwardly to the dot-dash line position where the lugs 90 clear the bends 91 permitting the barrier to be swung to the dot-dash line position shown in Fig. 1. When the barrier 70 is in the dot-dash line position shown in Fig. 1, the grass cuttings in the carrier 86 and in the grass catcher may readily be dumped without interference by the barrier 70 by merely removing the grass catcher 11 from the lugs 12 on the lower frame and dumping the catcher in the usual manner. After dumping, the barrier 70 may be swung back and the lugs 90 positioned behind the bends 91.

It will be appreciated that the grass cuttings will be conveyed around by the rotary floor and be dammed up by the barrier 70 with the carrier 86 being loaded up with grass cuttings and supporting these grass cuttings, thereby relieving the rotary floor of the weight of these cuttings.

The present invention, therefore, provides an improved grass catcher which can be attached to a conventional lawn mower and which, when attached, will eliminate the interruptions in operation which have been necessary when using prior grass catchers to allow shifting of the grass cuttings to different portions of these prior grass catchers. The rotary floor of the grass catcher of the present invention conveys the cuttings from the forward and left-hand side of the grass catcher around to a barrier which dams up the cuttings so that a large amount of cuttings can be collected on the carrier 86 permitting a long period of uninterrupted use of the lawn mower. The barrier is so mounted that it may be readily swung to a neutral position where it will not interfere with the dumping of the grass cuttings when the catcher is full.

It will be appreciated that other types of one-way drives can be provided for driving the rotary floor in one-way direction regardless of the forward or backward movement of the catcher. In the usual lawn mower there is a one-way clutch drive connection between the ground engaging wheels of the lawn mower and the helical blades. A one-way drive for the rotary floor could be provided by having a ground engaging member which drives the rotary floor through a one-way drive clutch similar to that connecting the ground wheels of the mower and the helical cutting blades.

Various changes may be made in the details of construction without departing from the spirit and scope of the invention as defined by the appended claims.

I claim:

1. A grass catcher for lawn mowers comprising a body releasably attached to said lawn mower, a rotatable floor supported by said body, means carried by said body and in cooperating relationship with said floor for supporting and arresting cut grass deposited on said floor, and ground-engaging means secured to said body and adapted to rotate said floor when said mower is moved in one direction.

2. A grass catcher for lawn mowers comprising a body releasably attached to said lawn mower, a rotatable floor supported by said body, means carried by said body and in cooperating relationship with said floor for supporting and arresting cut grass deposited on said floor, ground-engaging means secured to said body and adapted to rotate said floor when said mower is moved in one direction, and a ground-engaging lifting roller on said body adapted to disengage the floor rotating means when the mower is moved in a direction opposite to the one direction.

3. A grass catcher for lawn mowers comprising a body releasably attached to said lawn mower, rotatable means supported by the body for carrying grass deposited thereon, a barrier supported by said body for arresting the rotary travel of the grass, and ground-engaging means secured to said body for rotating said rotatable means when said mower is moved in one direction.

4. A grass catcher for lawn mowers comprising a body releasably attached to said lawn mower, rotatable means supported by the body for carrying grass deposited thereon, a barrier supported by said body for arresting the rotary travel of the grass, ground-engaging means secured to said body for rotating said rotatable means when said mower is moved in one direction, and a ground-engaging lifting roller on said body adapted to disengage said ground-engaging means from said rotatable means when the mower is moved in a direction opposite to the one direction.

5. A grass catcher for lawn mowers comprising a body releasably attached to said lawn mower, rotatable means supported by the body for carrying grass deposited thereon, a barrier releasably supported by said body for arresting the rotary travel of said grass, said barrier being reciprocable and rotatable for releasing said body from said lawn mower, and ground-engaging means secured to said body adapted to rotate said rotatable means.

PAUL G. GATES.

REFERENCES CITED

The following references are of record in the file of this patent:

UNITED STATES PATENTS

| Number | Name | Date |
|---|---|---|
| 836,325 | Kevlin | Nov. 20, 1906 |
| 944,438 | Holmested | Dec. 28, 1909 |
| 1,295,822 | Munger | Feb. 25, 1919 |
| 1,369,258 | Meyers | Feb. 22, 1921 |
| 1,619,851 | Coley | Mar. 8, 1927 |
| 2,268,897 | Price | Jan. 6, 1942 |
| 2,494,062 | Sherrow | Jan. 10, 1950 |